United States Patent
Kerbler et al.

(10) Patent No.: US 10,590,886 B2
(45) Date of Patent: Mar. 17, 2020

(54) AIRCRAFT TURBOJET ENGINE NACELLE

(71) Applicant: SAFRAN NACELLES, Gonfreville l'Orcher (FR)

(72) Inventors: Olivier Kerbler, Gonfreville l'Orcher (FR); Fabrice Henri Emile Metezeau, Gonfreville l'Orcher (FR); Patrick Gonidec, Gonfreville l'Orcher (FR); Loïc Grall, Gonfreville l'Orcher (FR)

(73) Assignee: SAFRAN NACELLES, Gonfreville L'Orcher (FR)

( * ) Notice: Subject to any disclaimer, the term of this patent is extended or adjusted under 35 U.S.C. 154(b) by 327 days.

(21) Appl. No.: 15/655,276

(22) Filed: Jul. 20, 2017

(65) Prior Publication Data
US 2017/0327240 A1 Nov. 16, 2017

Related U.S. Application Data

(63) Continuation of application No. PCT/FR2016/050119, filed on Jan. 21, 2016.

(30) Foreign Application Priority Data

Jan. 21, 2015 (FR) ...................... 15 50489

(51) Int. Cl.
*F02K 1/72* (2006.01)
*B64D 33/04* (2006.01)
*B64D 29/06* (2006.01)
*B64D 27/16* (2006.01)

(52) U.S. Cl.
CPC ............... *F02K 1/72* (2013.01); *B64D 27/16* (2013.01); *B64D 29/06* (2013.01); *B64D 33/04* (2013.01); *F05D 2220/323* (2013.01); *Y02T 50/672* (2013.01)

(58) Field of Classification Search
CPC . F02K 1/72; F02K 1/625; F02K 1/763; F02K 1/80
See application file for complete search history.

(56) References Cited

U.S. PATENT DOCUMENTS 3,280,562 A * 10/1966 Theits .................. F02K 1/72
60/229
3,829,020 A * 8/1974 Stearns .................. F02K 1/09
239/265.13

(Continued)

FOREIGN PATENT DOCUMENTS

FR 2999239 6/2014
GB 1147351 4/1969

OTHER PUBLICATIONS

International Search Report for International Application PCT/FR2016/050119, dated May 6, 2016.

*Primary Examiner* — Andrew H Nguyen
(74) *Attorney, Agent, or Firm* — Burris Law, PLLC (57) ABSTRACT

The present disclosure relates to an aircraft turbojet engine nacelle, the nacelle including a rear section without a lower bifurcation, the rear section including a thrust reversal system, the thrust reversal system including a mobile cowl. The nacelle includes a guide system that translates as one with the mobile cowl, the guide system collaborating with at least one slide that is fixed in relation to the nacelle, the guide system and the slide being arranged near the position referred to as the 6 o'clock position.

15 Claims, 5 Drawing Sheets

(56) References Cited

U.S. PATENT DOCUMENTS

| 7,484,356 B1* | 2/2009 | Lair | F02K 1/72 |
| | | | 60/226.2 |
| 2008/0072571 A1* | 3/2008 | Beardsley | F02K 1/72 |
| | | | 60/226.2 |

* cited by examiner

AIRCRAFT TURBOJET ENGINE NACELLE

CROSS-REFERENCE TO RELATED APPLICATIONS

This application is a continuation of International Application No. PCT/FR2016/050119, filed on Jan. 21, 2016, which claims priority to and the benefit of FR 15/50489 filed on Jan. 21, 2015. The disclosures of the above applications are incorporated herein by reference.

FIELD

The present disclosure relates to a turbojet engine nacelle, a propulsion unit equipped with such a nacelle, as well as an aircraft provided with such a propulsion unit.

BACKGROUND

The statements in this section merely provide background information related to the present disclosure and may not constitute prior art.

An aircraft is propelled by several turbojet engines each housed in a nacelle, each nacelle further accommodating a set of auxiliary actuating devices relating to its operation and ensuring various functions when the turbojet engine is in operation or shut down.

The modern nacelles are intended to accommodate a bypass turbojet engine capable of generating, via the blades of the rotating fan, a hot gas flow (also called primary flow) and a cold air flow (also called secondary flow) which circulates outside of the turbojet engine through an annular passage, also called flow path, formed between two concentric walls of the nacelle. The primary and secondary flows are ejected from the turbojet engine by the backside of the nacelle.

A turbojet engine nacelle generally has a tubular structure including:
  a front section, or air inlet, located in front of the turbojet engine;
  a mid-section, intended to surround the fan of the turbojet engine;
  a rear section, intended to surround the combustion chamber of the turbojet engine and generally including thrust reverser means;
  an ejection nozzle, whose outlet is located downstream of the turbojet engine.

The rear section generally has an outer structure, which defines, with a concentric inner structure, called "Inner Fixed Structure" (IFS), the annular flow path used to channel the cold air flow.

The thrust reverser means allow, during the landing of an aircraft, improving the braking capability of said aircraft by redirecting forwards a major fraction of the thrust generated by the turbojet engine. In this phase, the thrust reverser generally obstructs the flow path of the cold flow and directs said cold flow forwardly of the nacelle, thereby generating a counter-thrust which is added to the braking of the aircraft wheels. The means implemented to carry out this reorientation of the cold flow vary according to the thrust reverser type. A common configuration is that of the thrust reversers called "cascade thrust reversers". In this type of thrust reverser, the outer cowl of the rear section is sliding. The rearward translation of this sliding cowl allows uncovering thrust reverser cascades putting in communication the cold flow path and the outside of the nacelle. The translation of the sliding cowl further allows deploying blocking flaps in the cold flow path. Thus, by the combined action of the blocking flaps and the thrust reverser cascades, the cold flow is redirected forwardly of the nacelle.

As mentioned above, the thrust reverser means are housed in the rear section of a nacelle. Three types of structural configuration for the rear section are mainly known, namely the structures respectively called "C-duct" "D-duct" and "O-duct" structures.

In a D-duct structure nacelle, the inner and outer structures of the rear section of the nacelle are secured to each other, via two connecting islets called bifurcations. The bifurcations are disposed respectively according to the positions called "twelve o'clock" position (upper bifurcation) and "six o'clock" position (lower bifurcation). It should be recalled that the "twelve o'clock" and "six o'clock" positions are conventionally defined by analogy with a watch dial, the nacelle being in the operation position, that is to say under the wing. The "twelve o'clock" position is accordingly located at the attachment mast of the nacelle, while the "six o'clock" position corresponds to the diametrically opposite position. In the case of a D-duct structure nacelle, the sliding cowl is mounted in translation on the outer structure of the rear section. The sliding cowl is generally constituted of two half parts.

In an O-duct or C-duct structure nacelle, the rear section is configured such that a lower bifurcation is not necessary. This represents a great gain in efficiency for the propulsion unit since the cold flow path is no longer obstructed in its lower part as is the case for the D-duct structures. Furthermore, the O-duct or C-duct structures also allow significant gains in terms of mass.

In an O-duct or C-duct structure, the sliding cowl, or movable cowl, is generally mounted on slides disposed on either side of the suspension pylon (or mast) of the propulsion unit. These slides may be disposed directly on the pylon, or on an intermediate member secured to the pylon when the propulsion unit is mounted. The cowl is guided and supported only at these slides, therefore only in the vicinity of the "twelve o'clock" position.

Moreover, in an O-duct structure, the sliding cowl forms a one-piece structure. In order to meet various constraints such as avoiding the re-ingestion of air by the motor, avoiding directing a fraction of the thrust towards the fuselage of the aircraft, etc., the profile of the cascades ensuring the redirection of the cold flow, is generally not uniform along the circumference of the cascade assembly. It follows therefrom that the lateral efforts associated with the thrust reversal undergone by the cascades are not uniformly distributed. The sum of these lateral efforts is non-zero, which generates a lateral force applied on the cascade assembly and therefore on the propulsion unit. This lateral force generates a pendulum movement of the propulsion unit.

This non-uniform distribution also generates a non-uniform deformation of the thrust reverser, which become oval during the thrust reversal phases.

SUMMARY

The present disclosure provides an aircraft turbojet engine nacelle, the nacelle including a rear section without a lower bifurcation, the rear section including a thrust reverser system, the thrust reverser system including a movable cowl, the nacelle being characterized in that it includes a guide system secured in translation to the movable cowl, said guide system cooperating with at least one crosshead fixed relative to the nacelle, the guide system and the crosshead being disposed in the vicinity of the position called "6 o'clock" position.

Thus, by providing a guide system cooperating with a fixed crosshead, lateral strain absorbing at the lower part of the nacelle is provided, in the "six o'clock" position. The parasitic distortions and movements generated in the "O-duct" or "C-duct" type nacelles of the state of the art are accordingly limited, and may even be totally suppressed. Furthermore, the guide system in accordance with the present disclosure simply integrates into the nacelle because the guide system is advantageously inserted instead of a solid cascade, the one normally positioned at six o'clock. Moreover, a short type guiding will be advantageously made, thus allowing correctly absorbing the lateral forces while limiting the risk of hypostatism in the guiding of the movable cowl.

In one form, the crosshead cooperates with the guide system via at least one bearing member, such as a pad, the crosshead being shaped so that the spacing, along the translation direction of the guide system, between the farthest bearing points of the crosshead is less than one-fifth ($1/5^{th}$) of the guide length provided by the guide system.

In another form, the crosshead is secured to a peripheral frame intended to be fastened to the fan casing of a turbojet engine.

In in yet another form, the crosshead is fastened directly to the fan casing.

In one form, the guide system includes a guide rail.

In another form, the guide rail has two lateral slides.

In another form, the crosshead includes at least two guide pads each cooperating with one of the two slides of the guide rail.

In one variation, the thrust reverser system includes thrust reverser cascades, such as sliding thrust reverser cascades.

In another variation, the thrust reverser system includes sliding thrust reverser cascades, one front end of the guide system being secured to a peripheral frame secured to the thrust reverser cascades.

In one form, the guide system is disposed between two thrust reverser cascades.

In another form, the guide system is disposed at the location normally occupied by a cascade called solid cascade.

In yet another form, the guide system is secured to the front peripheral frame.

In other forms, one rear end of the guide system is secured to a peripheral frame of the movable cowl.

In still another form, the guide system is extended by a beam secured to the movable cowl.

The present disclosure also concerns an aircraft propulsion unit, including a bypass turbojet engine, the propulsion unit including a nacelle as defined above.

Further, the present disclosure relates to an aircraft including at least one propulsion unit as defined herein, the propulsion unit being supported by a pylon, the pylon including guide rails of the movable cowl of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
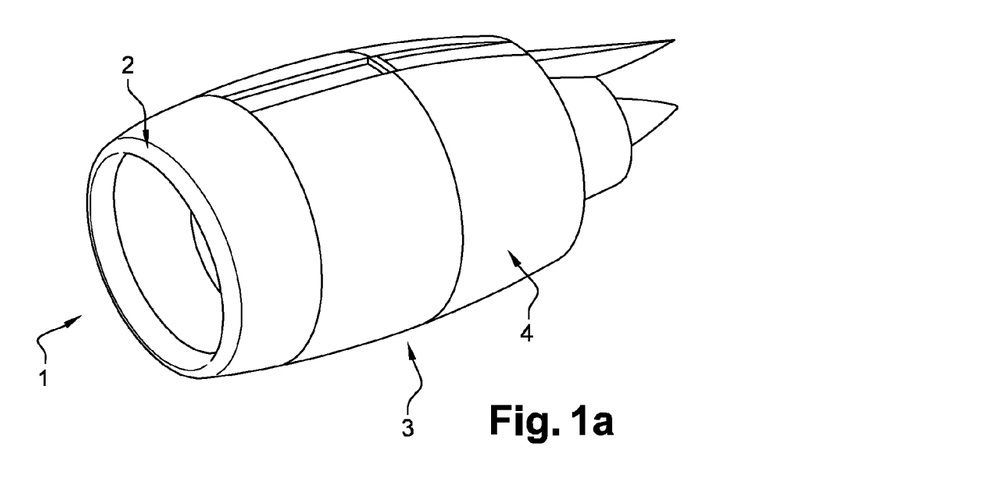
FIG. 1a is a perspective view of a nacelle in "direct jet" configuration in accordance with the teachings of the present disclosure.
Figure 1B:
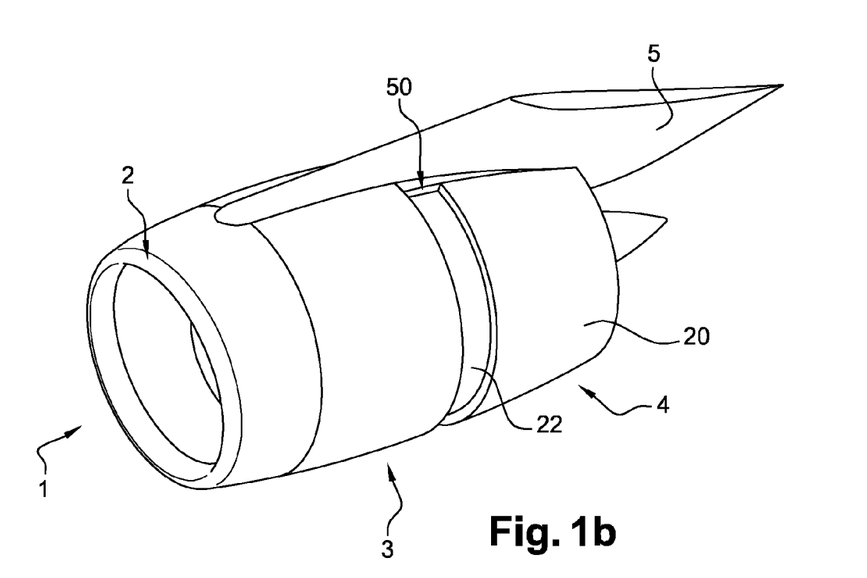
FIG. 1b is a perspective view of a nacelle in a "reverse jet" configuration in accordance with the teachings of the present disclosure.

FIGS. 1a and 1b show a view of a nacelle 1 in accordance with the present disclosure. Said nacelle includes an air inlet 2, a mid-section 3, as well as a rear section 4. In FIG. 1a, the nacelle 1 is represented alone, while in FIG. 1b, the nacelle 1 may be seen mounted on a pylon 5 (also known under the name of "engine mast"). Moreover, FIG. 1a shows the nacelle in the "direct jet" configuration, that is to say with the thrust reverser system in the retracted position, while FIG. 1b shows the nacelle in the "reverse jet" configuration, that is to say with the thrust reverser system in the deployed position. Thus, it is visible in FIG. 1b that a movable cowl 20 of the rear section 4 is in the backward position, exposing a thrust reverser cascade assembly 22. In the example, the movement of the movable cowl 20 is supported and guided by rails 50 disposed on either side of the pylon 5.

In the example, the structure of the nacelle is of the "O-duct" type and therefore includes no bifurcation in the lower part of the cold flow path. It should be noted that the present disclosure is also applicable to a nacelle with a C-duct structure.

Figure 2A:
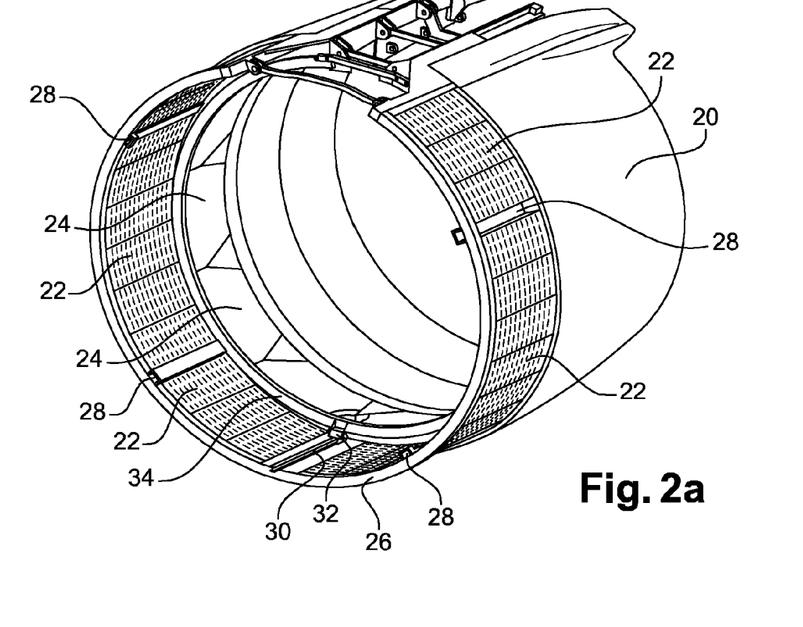
FIG. 2a is a perspective view of a rear section of a nacelle having a thrust reverser system in a retracted position in accordance with the teachings of the present disclosure.
Figure 2B:
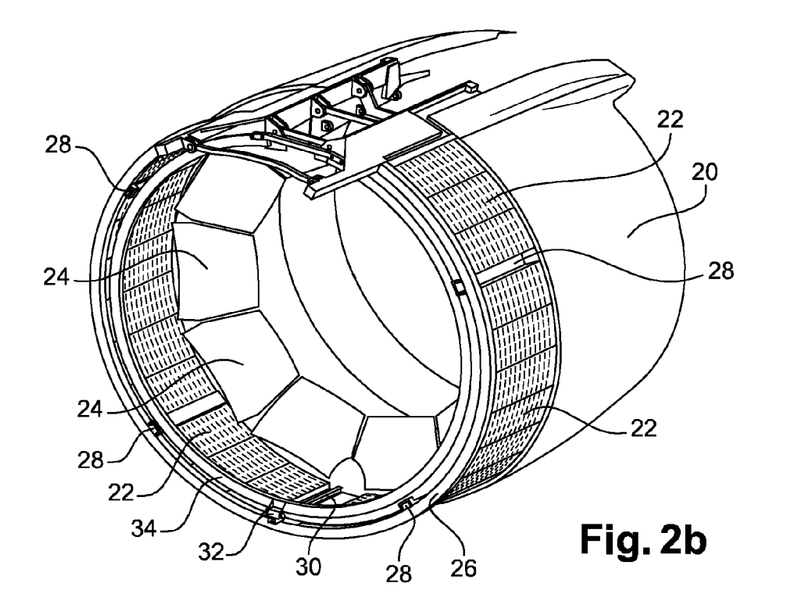
FIG. 2b is a perspective view of a rear section of a nacelle having a thrust reverser system in a deployed position in accordance with the teachings of the present disclosure.

FIGS. 2a and 2b represent one part of the rear section of the nacelle of FIGS. 1a and 1b, showing the members of the thrust reverser system respectively in the retracted position and in the deployed position.

The thrust reverser system comprises a movable cowl 20, in one piece, which forms the outer surface of the rear section of the nacelle. The movable cowl 20 is slidably mounted, in the example via rails 50, secured to the pylon 5 supporting the propulsion unit (namely, the assembly formed by a turbojet engine and the associated nacelle). The thrust reverser system further comprises thrust reverser cascades 22, in the example sliding cascades, and blocking flaps 24 movable in rotation. The thrust reverser system includes actuators (not shown), in particular electromechanical actuators, allowing sliding the movable cowl between the retracted position (FIG. 2a) and the deployed position (FIG. 2b) thereof, and conversely.

When the thrust reverser system is retracted (FIG. 2a):
- the movable cowl 20 is in the retracted position, corresponding to a forward position in which it provides the aerodynamic continuity with the mid-section of the nacelle;
- the blocking flaps 24 are in the retracted position, a position in which they are aligned with the inner surface of the movable cowl 20;
- the thrust reverser cascades 22 are in the retracted (or forward) position, a position in which they are disposed around the fan casing of the turbojet engine.

When the thrust reverser system is deployed (FIG. 2b):
- the movable cowl is in the deployed position, corresponding to a backward position, in which it uncovers the thrust reverser cascades 22 which are in the backward position thereof;
- the blocking flaps 24 are in the deployed position, a position in which they obstruct at least partially the cold flow path;
- the thrust reverser cascades 22 are in the deployed (or backward) position, a position in which they are disposed backwards of the fan casing of the turbojet engine, and in which they redirect the cold flow outwardly of the nacelle.

It should be noted that since the thrust reverser cascades 22 are in the example sliding cascades, said sliding cascades being linked in translation to the movable cowl 20, and the relative position of the thrust reverser cascades 22 relative to the movable cowl 20 may not vary during the deployment or the retraction of the thrust reverser system.

The thrust reverser cascades 22 are secured to a front peripheral frame 26. Several housings 28 are provided for the actuators of the thrust reverser system. These housings 28, four housings in the example of FIGS. 2a and 2b, are disposed between some of the thrust reverser cascades 22.

In the "six o'clock" position (or in the vicinity of this position), at the location normally occupied by a cascade called solid cascade, such a solid cascade being provided to limit a redirection of the cold flow downwards, a guide system 30 is disposed. Thus, the guide system 30 is advantageously disposed between two thrust reverser cascades 22, backwards of the front peripheral frame 26 of the cascades 22.

Figure 3A:
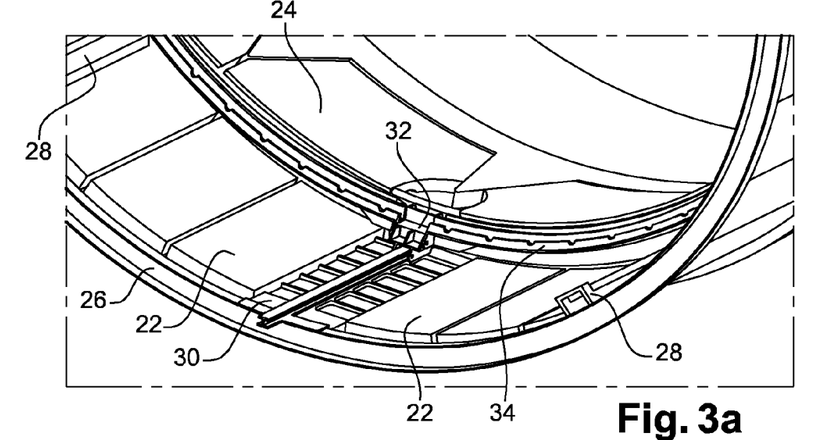
FIG. 3a is an enlarged perspective view of the rear section of the nacelle of FIG. 2a in accordance with the teachings of the present disclosure.
Figure 3B:
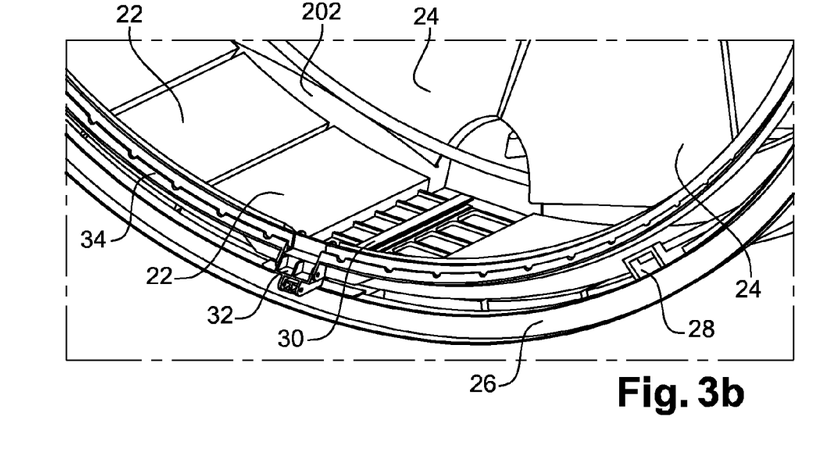
FIG. 3b is an enlarged perspective view of the rear section of the nacelle of FIG. 2b in accordance with the teachings of the present disclosure.

According to the present disclosure, the guide system 30 is fixed relative to the movable cowl 20 (and therefore, in the example, relative to the thrust reverser cascades 22), being in the example secured to the front peripheral frame 26. The guide system 30 cooperates with a crosshead 32, movable relative to the movable cowl 20 and to the thrust reverser cascades, and therefore relative to the guide system 30. The crosshead 32 is however fixed relative to the non-movable members of the nacelle and of the propulsion unit. In the example, the crosshead 32 is secured to a peripheral frame 34, which is in the example a part secured to the fan casing, known under the name of intermediate casing shroud. Alternatively, the crosshead 32 may be fastened directly to the fan casing. Thus, as visible in FIGS. 2a and 2b, the relative position of the crosshead 32 and of the guide system 30 is related to the position of the movable cowl 20 and therefore of the thrust reverser cascades 22. This relative position has two extremes, corresponding to the retracted and deployed positions of the thrust reverser system. These two extreme positions are more visible in FIGS. 3a (retracted thrust reverser) and 3b (deployed thrust reverser).

Figure 3C:
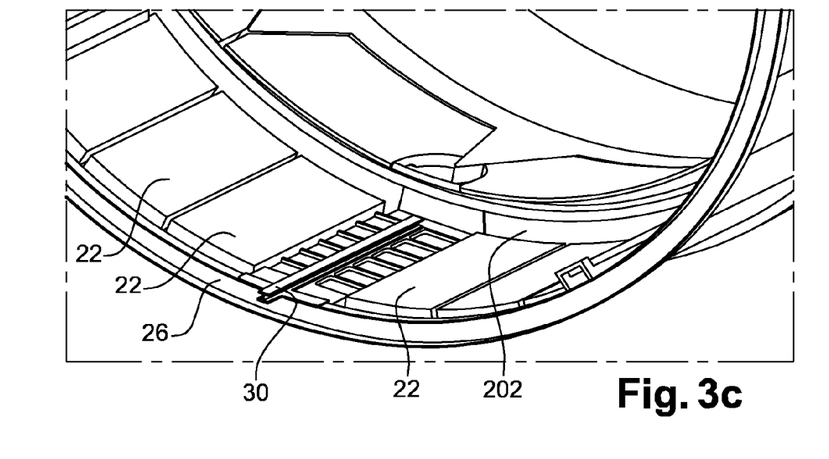
FIG. 3c is a, enlarged perspective view corresponding to FIG. 3a, without a crosshead and a peripheral frame to which the crosshead is secured in accordance with the teachings of the present disclosure.
Figure 4A:
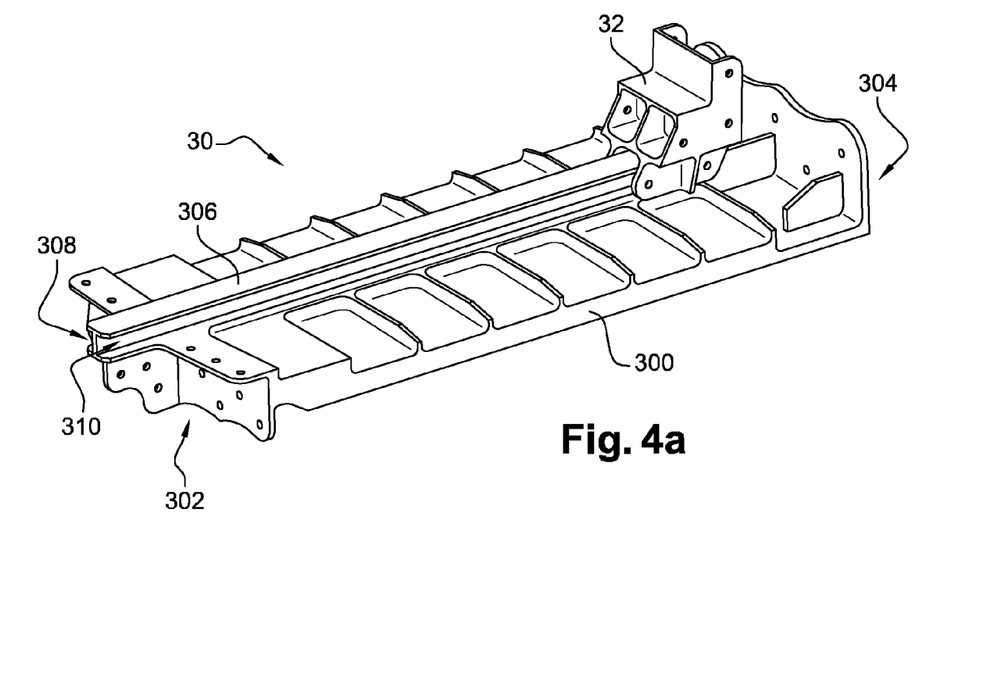
FIG. 4a is a perspective view of a guide system and a crosshead in a position corresponding to a thrust reverser system in a retracted position in accordance with the teachings of the present disclosure.
Figure 4B:
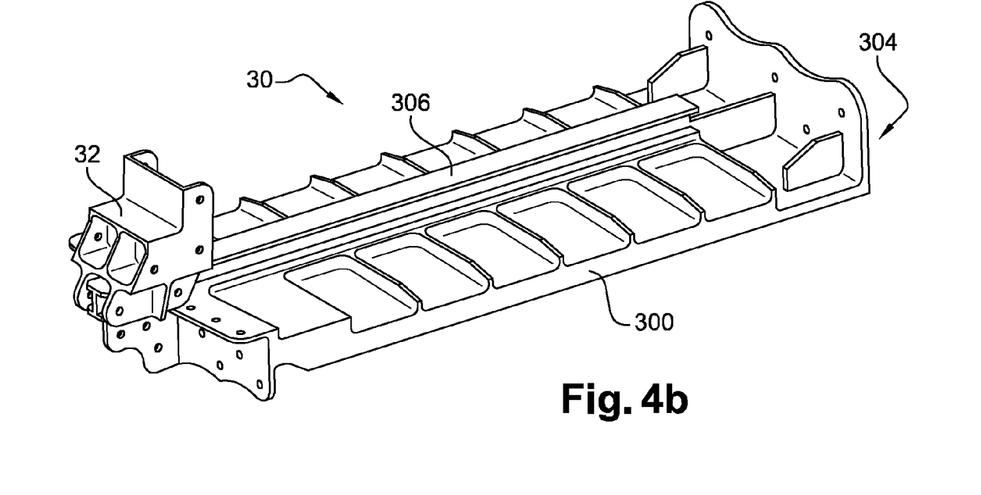
FIG. 4b is a perspective view of a guide system and a crosshead in a position corresponding to a thrust reverser system in a deployed position in accordance with the teachings of the present disclosure.

FIGS. 4a and 4b are isolated views of the guide system 30 and of the crosshead 32. The guide system 30 includes a body 300 which has a front part 302, provided to be fastened to the front peripheral frame 26, for example by splicing, and a rear part 304, provided to be fastened to the movable cowl 20, for example by riveting and/or splicing. In the example, the guide system 30 is secured to a peripheral frame 202 (visible in FIG. 3c) of the movable cowl 20. The guide system 30 includes a protruding portion, a guide rail 306. In the example, the guide rail 306 includes two lateral slides 308, 310. In the example of FIGS. 4a and 4b, the guide system 30 constitutes a one-piece part. However, it might be desired to make this member in two or more parts, for example the body 300 and the guide rail 306, for example in order to allow fastening the rail 306 to the body 300 in an adjustable manner (for example in height). Furthermore, these two members might be made of different materials, for example a composite material for the body 300 and a metal material for the rail 306.

The crosshead 32 includes guide pads 320 (visible in FIG. 5b) cooperating with each of the lateral slides 308, 310. In the example, the crosshead 32 includes four guide pads, disposed on either side of the rail 306, facing each other in pairs. The guide pads are constituted or coated with a material facilitating the sliding, such as for example Teflon. The guide pads 320 may be mounted in rotation on the crosshead 32, or form sliding pads.

Figure 5A:
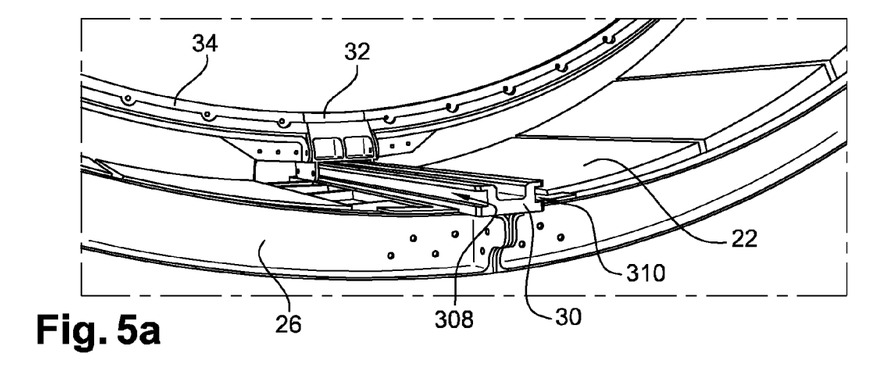
FIGS. 5a and 5b are partial perspective views of a nacelle rear section having an enlarged guide rail in accordance with the teachings of the present disclosure.
Figure 5B:
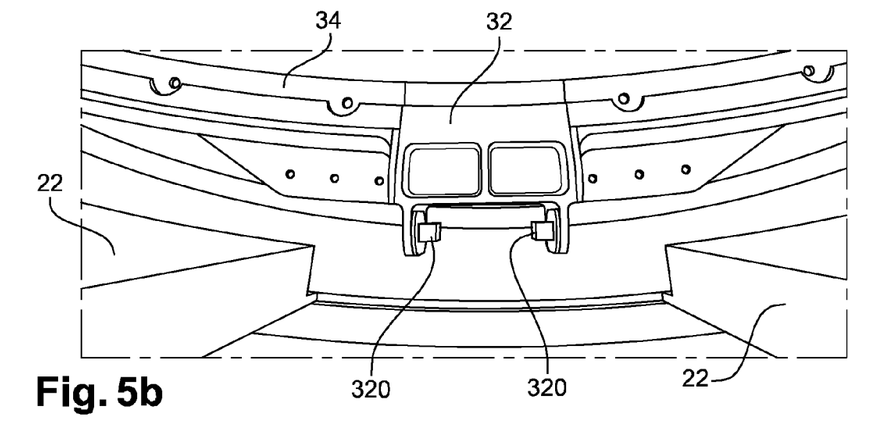

FIG. 5a shows an enlarged guide rail 306, thereby increasing the rigidity of the guide system.

Figure 6:
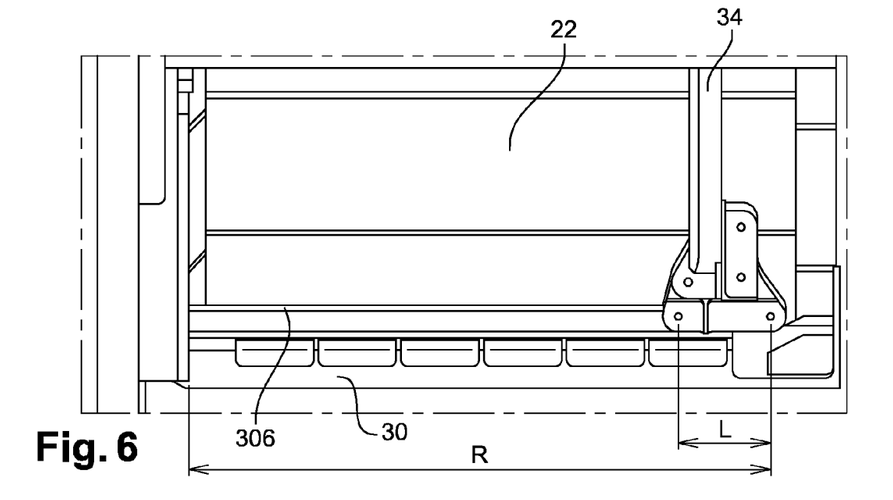
FIG. 6 is a partial side view of a nacelle rear section showing a guide system and a crosshead in accordance with the teachings of the present disclosure.

FIG. 6 shows the guide system and the crosshead 32 seen from the side. In the example, the guiding length R provided by the rail 306 is of 500 mm, while the longitudinal spacing L between the bearing points of the guide pads is of 80 mm. In order to provide a satisfactory lateral strain absorbing while reducing the risk of hyperstatism, it is advantageous to carry out a short guiding. To this end, the ratio between the longitudinal spacing L between the bearing points of the pads and the guide length R is lower than 0.2.

In a variant not represented, the guide rail might have, at its rear part, an extension extending in the form of a beam secured to the movable cowl 20. Thus, via this extension, the guide system will be fixedly fastened to the movable cover 20 and will participate in the rigidity of said movable cover.

Although the present disclosure has been described relating to a various forms, it is obvious that it is in no way limited thereto and that it comprises all the technical equivalents of the described means as well as the combinations thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft turbojet engine nacelle comprising:
a rear section without a lower bifurcation, wherein the rear section includes a thrust reverser system, the thrust reverser system including a movable cowl; and
a guide system secured to the movable cowl and being translatable with the movable cowl, the guide system extending along a direction parallel to a moving direction of the movable cowl,
wherein the guide system defines opposing ends along the movable direction, the guide system cooperating with at least one crosshead fixed relative to the nacelle, the guide system being movable relative to the at least one crosshead such that the at least one crosshead is located at one of the opposing ends of the guide system when the movable cowl is in a retracted position, and at the other one of the opposing ends of the guide system when the movable cowl is in a deployed position, and
wherein the guide system and the at least one crosshead are disposed at a "6 o'clock" position,
wherein the thrust reverser system includes thrust reverser cascades, wherein the guide system is disposed between an adjacent two of the thrust reverser cascades, wherein the guide system includes a plate body having longitudinal sides disposed side by side with the adjacent two of the thrust reverser cascades and a guide rail extending radially inward from the plate body, and wherein the at least one crosshead includes an elongated slot having an opening facing the guide rail for receiving the guide rail therein.

2. The nacelle according to claim 1, wherein the at least one crosshead cooperates with the guide system by at least one bearing member, wherein the at least one crosshead is shaped such that a spacing, along a translation direction of the guide system, between farthest bearing points of the at least one crosshead is less than one fifth of a guiding length provided by the guide system.

3. The nacelle according to claim 2, wherein the at least one bearing member is a pad.

4. The nacelle according to claim 1, wherein the at least one crosshead is secured to a peripheral frame that is fastened to a fan casing.

5. The nacelle according to claim 1, wherein the guide system includes a guide rail.

6. The nacelle according to claim 5, wherein the guide rail includes two slides.

7. The nacelle according to claim 6, wherein the at least one crosshead includes at least two guide pads, each of the guide pads cooperating with one of the two slides of the guide rail.

8. The nacelle according to claim 1, wherein the thrust reverser cascades are slidable.

9. The nacelle according to claim 8, wherein a front end of the guide system is secured to a front peripheral frame, the front peripheral frame being secured to the thrust reverser cascades.

10. The nacelle according to claim 1, wherein the guide system includes two longitudinal sides disposed side by side with the adjacent two of the thrust reverser cascades.

11. The nacelle according to claim 1, wherein the guide system is secured to a front peripheral frame.

12. The nacelle according to claim 1, wherein a rear end of the guide system is secured to a peripheral frame of the movable cowl.

13. The nacelle according to claim 1, wherein the guide system is extended by a beam secured to the movable cowl.

14. An aircraft propulsion unit, including a bypass turbojet engine, the propulsion unit including a nacelle according to claim 1.

15. An aircraft including at least one propulsion unit in accordance with claim 14, the at least one propulsion unit being supported by a pylon, the pylon including guide rails of the movable cowl of the nacelle.

* * * * *